(12) United States Patent
Zhu et al.

(10) Patent No.: US 11,532,935 B2
(45) Date of Patent: Dec. 20, 2022

(54) RAPID SHUTDOWN DEVICE FOR PHOTOVOLTAIC SYSTEM AND CONTROL METHOD THEREOF AND PROTECTION SYSTEM

(71) Applicant: Delta Electronics (Shanghai) CO., LTD, Shanghai (CN)

(72) Inventors: Xuancai Zhu, Shanghai (CN); Bingwen Weng, Shanghai (CN); Yuxi Wang, Shanghai (CN); Bin Wang, Shanghai (CN); Chengjun He, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 121 days.

(21) Appl. No.: 17/189,473

(22) Filed: Mar. 2, 2021

(65) Prior Publication Data

US 2021/0281065 A1    Sep. 9, 2021

(30) Foreign Application Priority Data

Mar. 9, 2020 (CN) .......................... 202010156979.7
Nov. 3, 2020 (CN) .......................... 202011212049.5

(51) Int. Cl.
*H02H 7/20* (2006.01)
*H02S 40/32* (2014.01)

(52) U.S. Cl.
CPC .............. *H02H 7/20* (2013.01); *H02S 40/32* (2014.12)

(58) Field of Classification Search
CPC .......... H02H 7/20; H02H 7/12; H02H 7/1222; H02H 7/1225; H02S 40/32; H02S 40/34; H02S 40/36; H02S 40/38
See application file for complete search history.

(56) References Cited

U.S. PATENT DOCUMENTS

| | | | |
|---|---|---|---|
| 10,396,593 B1 | 8/2019 | Judkins et al. | |
| 2001/0023703 A1* | 9/2001 | Kondo | H02S 50/10 136/291 |
| 2015/0381108 A1* | 12/2015 | Höft | H02S 50/00 361/91.1 |
| 2020/0343729 A1* | 10/2020 | Zhu | H02J 3/385 |

FOREIGN PATENT DOCUMENTS

| | | |
|---|---|---|
| CN | 106602504 A | 4/2017 |
| CN | 107112764 A | 8/2017 |
| CN | 206775459 U | 12/2017 |
| CN | 109546959 A | 3/2019 |

* cited by examiner

*Primary Examiner* — Nguyen Tran
(74) *Attorney, Agent, or Firm* — Qinghong Xu

(57) ABSTRACT

The present disclosure provides a rapid shutdown device for a photovoltaic system, which is connected between a photovoltaic power generation module and a photovoltaic inverter and comprises an input port and an output port. The rapid shutdown device further comprises: a first switch and a second switch; a third switch and a fourth switch; a controller coupled to control terminals of the first switch, the third switch, and the fourth switch, and configured to control on and off of the first switch, the third switch, and the fourth switch, so that the rapid shutdown device operates in a normal state, a bypass state or a shutdown state.

15 Claims, 16 Drawing Sheets

RAPID SHUTDOWN DEVICE FOR PHOTOVOLTAIC SYSTEM AND CONTROL METHOD THEREOF AND PROTECTION SYSTEM

CROSS REFERENCE

This application is based upon and claims priority to Chinese Patent Application No. 202010156979.7, filed on Mar. 9, 2020 and Chinese Patent Application No. 202011212049.5, filed on Nov. 3, 2020, the entire contents thereof are incorporated herein by reference.

TECHNICAL FIELD

The disclosure relates to the technical field of power electronics, and in particular, to a rapid shutdown device for a photovoltaic system and a control method thereof as well as a protection system for a photovoltaic system.

BACKGROUND

At present, the technology of photovoltaic power generation is relatively mature and has been widely used at home and abroad. The photovoltaic system includes photovoltaic panels, junction boxes and inverters. The photovoltaic panel converts the solar energy into direct current (DC) electric power, and the inverter converts the DC electric power into alternating current (AC) electric power, which is transmitted to power grid or directly supplied to customers.

The photovoltaic panels connected in series or in parallel have a very high voltage and energy. In sudden situations such as maintenance or earthquake, fires etc., workers may come into contact with photovoltaic panels or wires with dangerous voltages, posing a risk of electric shock. Therefore, a rapid shutdown device (RSD) should be applied to the photovoltaic system, which is used to cut off the dangerous voltage in the operating area of the workers before the workers beginning to work, and reduce or eliminate the risk of electric shock.

A rapid shutdown device can cut off the photovoltaic panel, i.e. the photovoltaic power generation module 101, from the photovoltaic system to ensure the safety of personnel. In the related art shown in FIG. 1A, each photovoltaic power generation module 101 is connected to one rapid shutdown device 102, and the outputs of all rapid shutdown devices are connected in series, the inverter 103 is connected to the series-connected rapid shutdown devices, so as to form a photovoltaic system. A triggering device 104 is used to control on and off of an internal switch of the rapid shutdown device. When the internal switch of the rapid shutdown device is on, a string of the photovoltaic power generation modules 101 (form a high-voltage photovoltaic array) normally output power to the inverter 103, and the inverter 103 converts the power and outputs the converted power to the power grid or a load. In the case of installation, maintenance or abnormal operation, the workers control the triggering device 104 to turn off the internal switch of the rapid shutdown device, which makes the high-voltage photovoltaic array being divided into several low-voltage arrays and cuts off dangerous voltage and dangerous energy, thus reducing or eliminating the risk of electric shock for workers.

SUMMARY

It is an object of the present disclosure to provide a rapid shutdown device for a photovoltaic system and a control method thereof.

According to a first aspect of the present disclosure, a rapid shutdown device for a photovoltaic system is provided. The rapid shutdown device is connected between a photovoltaic power generation module and a photovoltaic inverter, and comprising an input port and an output port, the rapid shutdown device further includes: a first switch and a second switch, wherein a first terminal of the first switch is connected to one terminal of the input port, a second terminal of the first switch is connected to a first terminal of the second switch, and a second terminal of the second switch is connected to the other terminal of the input port; a third switch and a fourth switch, wherein the third switch is connected between the first terminal of the second switch and one terminal of the output port, and the fourth switch is connected between the second terminal of the second switch and the other terminal of the output port; and a controller, coupled to the control terminals of the first switch, the third switch, and the fourth switch respectively, and configured to control on and off of the first switch, the third switch, and the fourth switch, so that the rapid shutdown device operates in a normal state, a bypass state or a shutdown state; wherein, in response to the rapid shutdown device operates in the normal state, the first switch, the third switch, and the fourth switch are all on, and the second switch is off; in response to the rapid shutdown device operates in the bypass state, the second switch, the third switch, and the fourth switch are all on, and the first switch is off; and in response to the rapid shutdown device operates in the shutdown state, both the third switch and the fourth switch are off.

According to a second aspect of the present disclosure, a control method for a rapid shutdown device is provided. The rapid shutdown device is applied to a photovoltaic system, is connected between a photovoltaic power generation module and a photovoltaic inverter and comprises an input port and an output port, the rapid shutdown device further includes: a first switch and a second switch, wherein a first terminal of the first switch is connected to one terminal of the input port, a second terminal of the first switch is connected to a first terminal of the second switch, and a second terminal of the second switch is connected to the other terminal of the input port; a third switch and a fourth switch, wherein the third switch is connected between the first terminal of the second switch and one terminal of the output port, and the fourth switch is connected between the second terminal of the second switch and the other terminal of the output port; a controller, coupled to the control terminals of the first switch, the third switch, and the fourth switch respectively, and configured to control on and off of the first switch, the third switch, and the fourth switch, so that the rapid shutdown device operates in a normal state, a bypass state or a shutdown state. The control method for the rapid shutdown device includes: when the rapid shutdown device operates in a shutdown state, detecting whether an online signal is received; in response to the rapid shutdown device operates in a shutdown state and the online signal is received, converting a state of the rapid shutdown device to a bypass state; when the rapid shutdown device operates in the bypass state, detecting whether the online signal is received, and acquiring an electrical parameter of the photovoltaic power generation module; and in response to the rapid shutdown device operates in the bypass state, the online signal is received, and the electrical parameter of the photovoltaic power generation module is higher than a set threshold, converting the state of the rapid shutdown device to a normal state.

According to a third aspect of the present disclosure, a protection system for a photovoltaic system is provided. The protection system includes at least one rapid shutdown device, each of the at least one rapid shutdown device having an input port and an output port, wherein the photovoltaic system comprises at least one first photovoltaic power generation module and at least one second photovoltaic power generation module, and a photovoltaic inverter. Each of the rapid shutdown devices includes: a first switch and a second switch, wherein a first terminal of the first switch is connected to one terminal of the input port, a second terminal of the first switch is connected to a first terminal of the second switch, and a second terminal of the second switch is connected to the other terminal of the input port; a third switch and a fourth switch, wherein the third switch is connected between the first terminal of the second switch and one terminal of the output port, and the fourth switch is connected between the second terminal of the second switch and the other terminal of the output port; and a controller, coupled to the control terminals of the first switch, the third switch, and the fourth switch respectively, and configured to control on and off of the first switch, the third switch, and the fourth switch, so that the rapid shutdown device operates in a normal state, a bypass state or a shutdown state. The input port of each of the at least one rapid shutdown device is coupled to a corresponding first photovoltaic power generation module, and the at least one second photovoltaic power generation module is connected in series with the output port of the rapid shutdown device.

It should be understood that the above general description and the following detailed description are merely exemplary and explanatory and are not restrictive.

BRIEF DESCRIPTION OF THE DRAWINGS

The accompanying drawings, which are incorporated into the specification and form a part of the specification, show the embodiments in accordance with the present disclosure and are used together with the specification to explain the principle of the disclosure. Obviously, the drawings in the following description are only some embodiments of the present disclosure, and those skilled in the art can obtain other drawings according to the drawings without any creative effort.

DETAILED DESCRIPTION

Figure 1A:
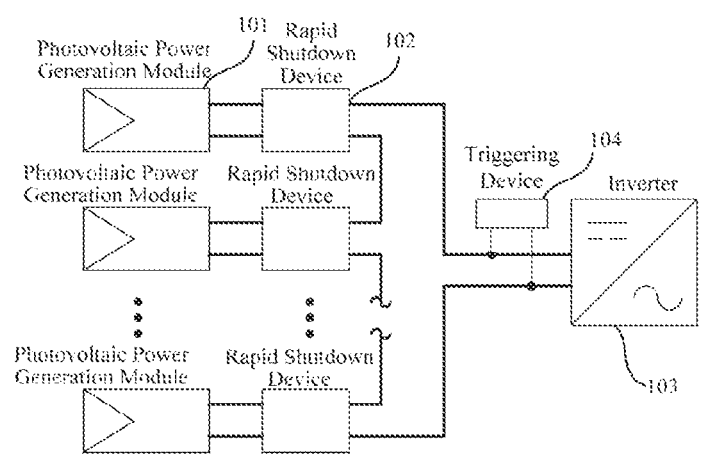
FIG. 1A schematically shows a schematic diagram of a photovoltaic system in the related art.

Example embodiments will now be described more fully with reference to the accompanying drawings. However, the exemplary embodiments can be embodied in a variety of forms and should not be construed as being limited to the embodiments set forth herein. Instead, these embodiments are provided so that the disclosure will be comprehensive and complete, and the idea of an exemplary embodiment fully communicated to those skilled in the art. The same reference numerals in the drawings denote the same or similar structures, and thus their detailed description will be omitted.

Although the relative terms such as "above" and "below" are used in the specification to describe the relative relationship of one component to another component to the icon, these terms are used in this specification for convenience only, for example, according to the direction of the example in the accompanying drawings. It will be understood that if the device of the icon is flipped upside down, the component described "above" will become the component "below". When a structure is "above" another structure, it may mean that a structure is integrally formed on another structure, or that a structure is "directly" disposed on another structure, or that a structure is "indirectly" disposed on other structures through another structure.

The terms "a", "an", "the", "said" and "at least one" are used to mean the existence of one or more elements/components/etc.; the terms "comprising" and "having" are used to mean an inclusive meaning and mean that there are additional elements/components/etc. in addition to the listed elements/components/etc.; the terms "first", "second", and "third" etc. are used merely as a token, but not a limitation on the number of objects.

In the related art, the rapid shutdown devices can be divided into two types, the first type is a shutdown type, and the second type is an output-voltage-limited type.

Figure 1B:
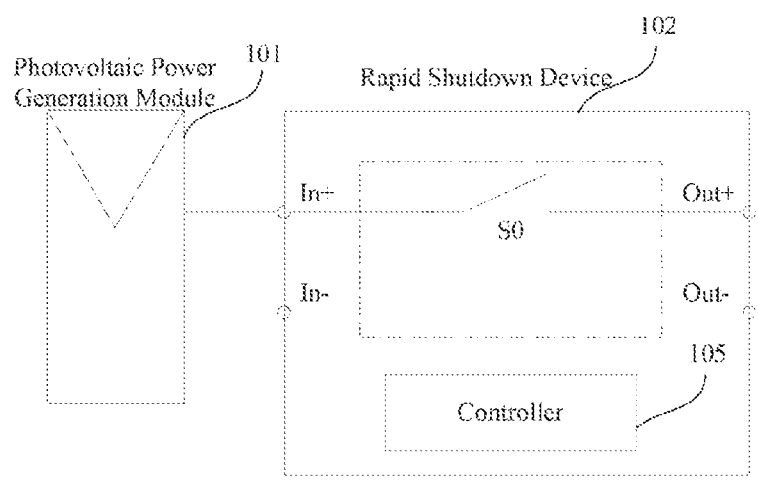
FIG. 1B schematically shows a schematic diagram of another rapid shutdown device in the related art.

The first type of RSD is shown in FIG. 1B, in which the switch S0 is usually a semiconductor switch controlled by the controller 105, such as a MOSFET or an IGBT. This type of RSD can operate in two states, i.e., a shutdown state and a normal state.

When S0 is on, RSD operates in the normal state, the electric energy generated by the photovoltaic power generation module 101 is output through the RSD. In most cases of the related art, there are a plurality of RSDs connected in series, and each of the RSDs transfers the electric energy generated by the corresponding photovoltaic power generation module 101. Finally, the total electric energy is transferred to a photovoltaic inverter and converted into the alternating current (AC) grid.

When S0 is off, RSD operates in the shutdown state, the output voltage of the photovoltaic power generation module 101 is disconnected by the RSD, so that the output voltage of the entire photovoltaic array formed by a string of photovoltaic power generation modules 101 is a safe voltage.

Figure 1C:
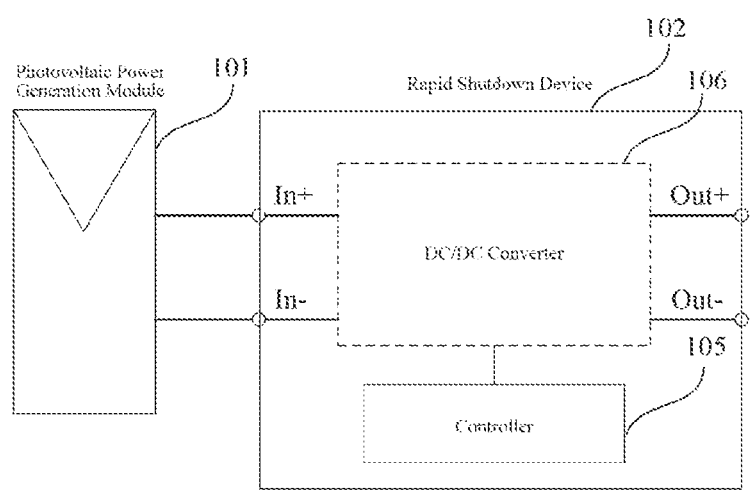
FIG. 1C schematically shows a schematic diagram of another rapid shutdown device in the related art.

The second type of RSD is shown in FIG. 1C, in which the DC/DC converter 106 can realize the voltage conversion from DC to DC. The DC/DC converter 106 could be several topologies, such as a buck converter, a boost converter, or buck-boost converter, etc. The second type of RSD can operate in two states, i.e., a low-voltage output state and a normal state.

In the normal state, the DC/DC converter inside the RSD converts the output voltage of the photovoltaic power generation module 101 into an appropriate voltage required by the system, so that the photovoltaic system can generate power normally.

In the low voltage output state, the DC/DC converter inside the RSD converts the voltage of the photovoltaic power generation module 101 into a lower voltage, so that the output voltage of the entire photovoltaic array is a safe voltage. The lower voltage can be 1V.

The RSDs shown in FIG. 1B and FIG. 1C usually use semiconductor switches, such as MOSFETs or IGBTs. Due to the limitations of technology and process level, it is difficult for semiconductor switches to achieve both high voltage and low impedance characteristics. Therefore, lower voltage devices are often used in actual designs, as a result, the withstand voltage value of the device only can match with the output voltage of a single photovoltaic power generation module. The problem is that each photovoltaic power generation module must be equipped with a corresponding RSD, as shown in FIG. 1A.

Since each photovoltaic power generation module in the photovoltaic array has to be connected to a rapid shutdown device, the system cost is relatively high.

To solve this technical problem, a rapid shutdown device for a photovoltaic system and a control method thereof, as well as a protection system for the photovoltaic system are provided.

Figure 2:
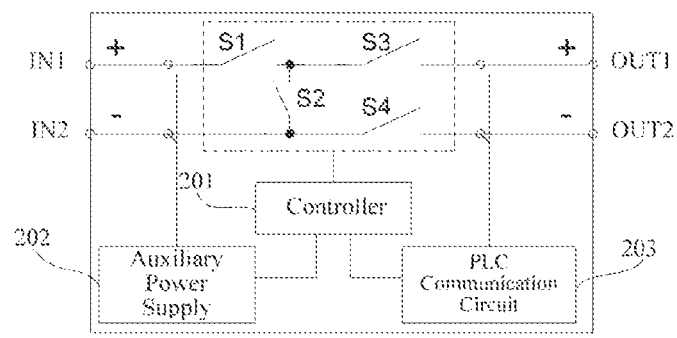
FIG. 2 schematically shows a schematic diagram of a rapid shutdown device for a photovoltaic system according to embodiments of the present disclosure.

As shown in FIG. 2, an embodiment of the present disclosure provides a rapid shutdown device for a photovoltaic system, which is connected between a photovoltaic power generation module and a photovoltaic inverter, and includes an input port and an output port. The rapid shutdown device further includes a first switch S1, a second switch S2, a third switch S3, a fourth switch S4 and a controller 201.

A first terminal of the first switch S1 is connected to one terminal IN1 of the input port of the rapid shutdown device, a second terminal of the first switch S1 is connected to a first terminal of the second switch S2, and a second terminal of the second switch S2 is connected to the other terminal IN2 of the input port of the rapid shutdown device.

The third switch S3 is connected between the first terminal of the second switch S2 and one terminal OUT1 of the output port, and the fourth switch S4 is connected between the second terminal of the second switch S2 and the other terminal OUT2 of the output port.

The controller 201 is coupled to the control terminals of the first switch S1, the third switch S3, and the fourth switch S4, and is used to control on and off of the first switch S1, on and off of the third switch S3, and on and off of the fourth switch S4, so as to make the rapid shutdown device operates in a normal state, a bypass state or a shutdown state.

When the rapid shutdown device operates in the normal state, the first switch S1, the third switch S3, and the fourth switch S4 are all on, and only the second switch S2 is off. When the rapid shutdown device operates in the bypass state, the second switch S2, the third switch S3, and the fourth switch S4 are all on, and only the first switch S1 is off. When the rapid shutdown device operates in the shutdown state, the third switch S3 and the fourth switch S4 are both off.

In the rapid shutdown device according to the embodiments of the present disclosure, the third switch S3 and the fourth switch S4 are rapid shutdown switches. The rapid shutdown switch adopts dual-switch redundancy, which can effectively ensure that the off function of the rapid shutdown switch is safe and reliable, and can achieve safe shutdown in case of one switch failure.

The first switch S1 and the second switch S2 are bypass switches, which can cooperate with the controller 201 to realize a bypass function. When the rapid shutdown device is operating in the normal state, the first switch S1, the third switch S3 and the fourth switch S4 are on, and the second switch S2 is off. At this point, the photovoltaic power generation current may flow through the first switch S1, the third switch S3, the fourth switch S4 and the photovoltaic power generation module connected to the rapid shutdown device, thus making the photovoltaic power generation module connected in the photovoltaic system to generate power normally. If the photovoltaic power generation module connected with the rapid shutdown device is abnormal, for example, the photovoltaic power generation module is blocked by the shadow of buildings and thus the power generation is reduced, which resulting in insufficient power supply for the rapid shutdown device, then this abnormal rapid shutdown device will convert to the bypass state, that is, the first switch S1 is off and the second switch S2 is on. At this point, the photovoltaic power generation current may flow through the second switch S2, the third switch S3, and the fourth switch S4, and may not flow through the abnormal photovoltaic power generation module connected with the rapid shutdown device. That is, this abnormal photovoltaic power generation module is bypassed from the photovoltaic system, and the entire photovoltaic system can still operate normally. On the other hand, after this abnormal photovoltaic power generation module is bypassed, it will no longer provide the photovoltaic power generation current, but it will not affect the power supply of the rapid shutdown device, that is, the basic control functions of the rapid shutdown device are still maintained.

In some embodiments, the first switch S1 may be a semiconductor switch, such as a MOSFET or an IGBT. The second switch S2 may be a diode or a semiconductor switch (such as a MOSFET or an IGBT). When the second switch S2 is a semiconductor switch, the controller 201 is connected to the control terminal of the second switch S2 to control on and off of the second switch S2. Optimized, the second switch S2 may also be a unidirectional switch, i.e., a diode. When the second switch S2 is a diode, it does not need to be controlled by the controller 201.

In some embodiments, the third switch S3 and the fourth switch S4 may be relays. The RSD in the related art as shown in FIG. 1B and FIG. 1C usually uses a semiconductor switch, while the safety and reliability of the semiconductor switch are lower than that of a mechanical switch when it is off. The embodiments of the present disclosure adopt a reasonable combination of mechanical switches and semiconductor devices, and also adopt a unique control method, which can realize high reliability and rapid shutdown functions.

Both high voltage resistance and low conduction impedance characteristics can be achieved by using mechanical switches such as relays. Therefore, a single RSD can block the higher voltage of entire string of photovoltaic power generation modules, and there is no need to equip a RSD for each photovoltaic power generation module, which can significantly save the costs.

In case of that the rapid shutdown device for the photovoltaic system provided by the embodiments of the present disclosure is used, there is no need to make every photovoltaic power generation module to connect to a corresponding rapid shutdown device. Compared with the photovoltaic system in the prior art, the cost can be effectively reduced. The reason is that voltage levels of the third switch S3 and the fourth switch S4 in the embodiments of the present disclosure can match with the voltage level of the entire string of photovoltaic power generation modules (that is, the voltage level of the photovoltaic system), thus when the third switch S3 and the fourth switch S4 are off. i.e., opened, the third switch S3 and the fourth switch S4 can withstand the voltage of the entire photovoltaic system. As for the rapid shutdown device of the prior art, the voltage level of the switch can only match with the voltage of a single photovoltaic power generation module, so in the prior art, one rapid shutdown device must be connected to only one photovoltaic power generation module.

Figure 4:
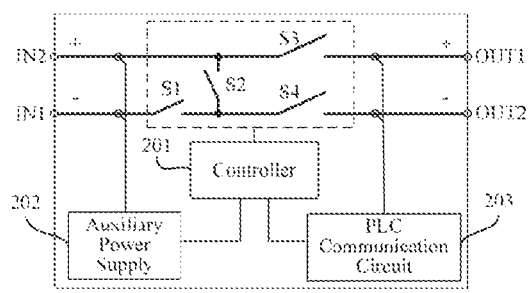
FIG. 4 schematically shows a schematic diagram of a rapid shutdown device for a photovoltaic system according to embodiments of the present disclosure.
Figure 5:
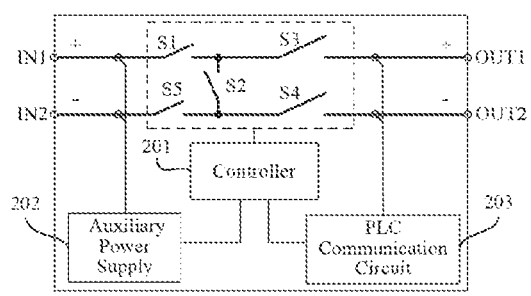
FIG. 5 schematically shows a schematic diagram of a rapid shutdown device for a photovoltaic system according to embodiments of the present disclosure.

In the present disclosure, the rapid shutdown device may have various structures as shown in FIG. 2, FIG. 4 and FIG. 5.

In the rapid shutdown device as shown in FIG. 2, one terminal IN1 of the input port of the rapid shutdown device is a positive terminal, and the other terminal IN2 is a negative terminal, and the first switch S1 is connected between the positive terminal IN1 of the input port and the first terminal of the second switch S2.

In a rapid shutdown device as shown in FIG. 4, one terminal IN1 of the input port of the rapid shutdown device is a negative terminal, and the other terminal IN2 is a positive terminal, and the first switch S1 is connected between the negative terminal IN1 of the input port and the second terminal of the second switch S2.

In a rapid shutdown device shown in FIG. 5, one terminal IN1 of the input port is a positive terminal, and the other terminal IN2 is a negative terminal, and the first switch S1 is connected between the positive terminal IN1 of the input port and the first terminal of the second switch S2. In addition, the rapid shutdown device may further include a fifth switch S5, which is connected between the negative terminal IN2 of the input port and the second terminal of the second switch S2.

As shown in FIG. 2, the rapid shutdown device further includes an auxiliary power supply 202, which is coupled to the first photovoltaic power generation module via the input port of the rapid shutdown device, and is used to convert the direct current power generated by the first photovoltaic power generation module and supply the converted power to the rapid shutdown device. As shown in FIG. 2, the auxiliary power supply 202 is connected to the controller 201 for supplying power to the controller 201.

In addition, the rapid shutdown device also includes a programmable logic controller (PLC) communication circuit 203. As shown in FIG. 2, the PLC communication circuit 203 is connected to the output port of the rapid shutdown device, receives the communication signal from the triggering device 305 and transmits a processed communication signal to the controller 201. The communication signal from the triggering device 305 includes an off-line signal or an online signal, wherein the online signal and the off-line signal can represent an operating state of the photovoltaic inverter 303. The triggering device 305 can be integrated inside the photovoltaic inverter 303 or can be set independently. At the same time, each switch inside the rapid shutdown device is detected. When a failure of any one switch is detected, the PLC communication circuit 203 can be notified to send 'fault information' to the photovoltaic inverter 303, and the photovoltaic inverter 303 notifies the maintenance personnel of this warning message.

In addition, compared with the traditional RSD in the prior art, the bypass operation state is added in the present disclosure, and the power generation of the photovoltaic system in scenarios such as weak light and shading can be effectively increased, and at the same time the stability and reliability of the entire photovoltaic system can be improved.

In some embodiments of the present disclosure, the rapid shutdown device may further include a detection circuit, which is coupled to the photovoltaic power generation module and the controller, and is used to detect the electrical parameters such as current, voltage or power output by the photovoltaic power generation module, and transmit the electrical parameters to the controller 201. The detection circuit can be arranged inside or outside the rapid shutdown device, and the present disclosure is not limited thereto.

Figure 6:
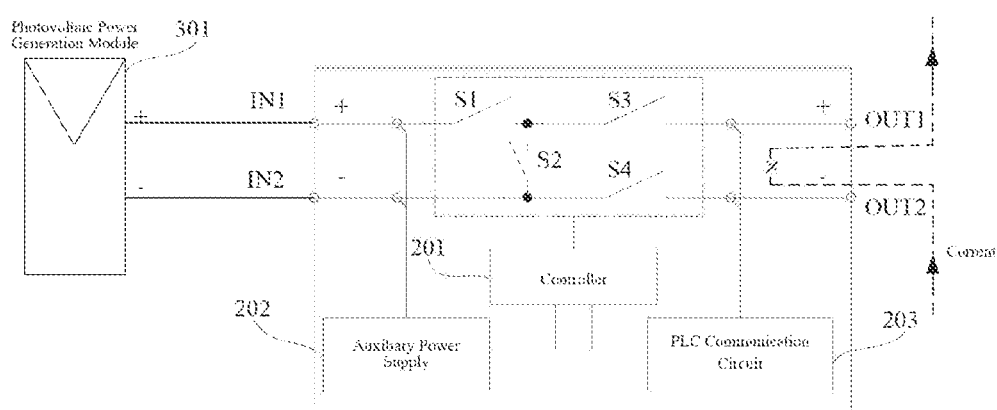
FIG. 6 schematically shows a schematic diagram of a current path of a rapid shutdown device in a shutdown state according to embodiments of the present disclosure.
Figure 7:
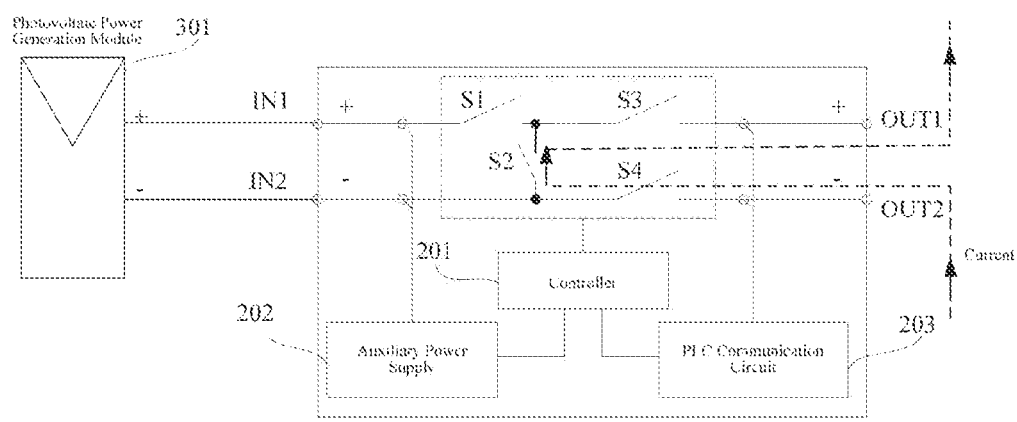
FIG. 7 schematically shows a schematic diagram of a current path of a rapid shutdown device in a bypass state according to embodiments of the present disclosure.
Figure 8:
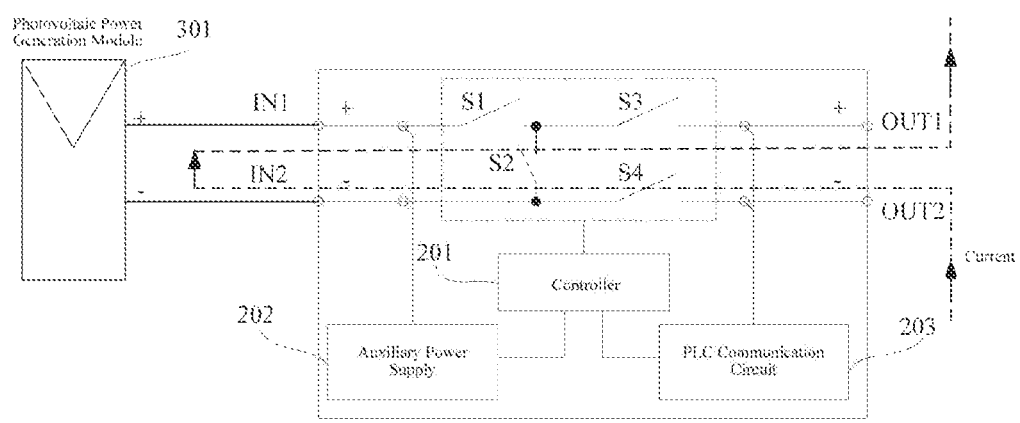
FIG. 8 schematically shows a schematic diagram of a current path of a rapid shutdown device in a normal state according to embodiments of the present disclosure.

FIG. 6, FIG. 7 and FIG. 8 respectively show a current path of the photovoltaic system in different operation states. The current paths are shown as dashed lines with an arrow. As shown in FIG. 6, the rapid shutdown device operates in the shutdown state, and no current flows through the RSD or the photovoltaic power generation module 301. As shown in FIG. 7, the rapid shutdown device operates in the bypass state, and the current flows through the third switch S3, the second switch S2, and the fourth switch S4, but not passes through the photovoltaic power generation module 301. As shown in FIG. 8, the rapid shutdown device operates in a normal state, and current flows through the third switch S3, the first switch S1, the photovoltaic power generation module 301, and the fourth switch S4.

Figure 9:
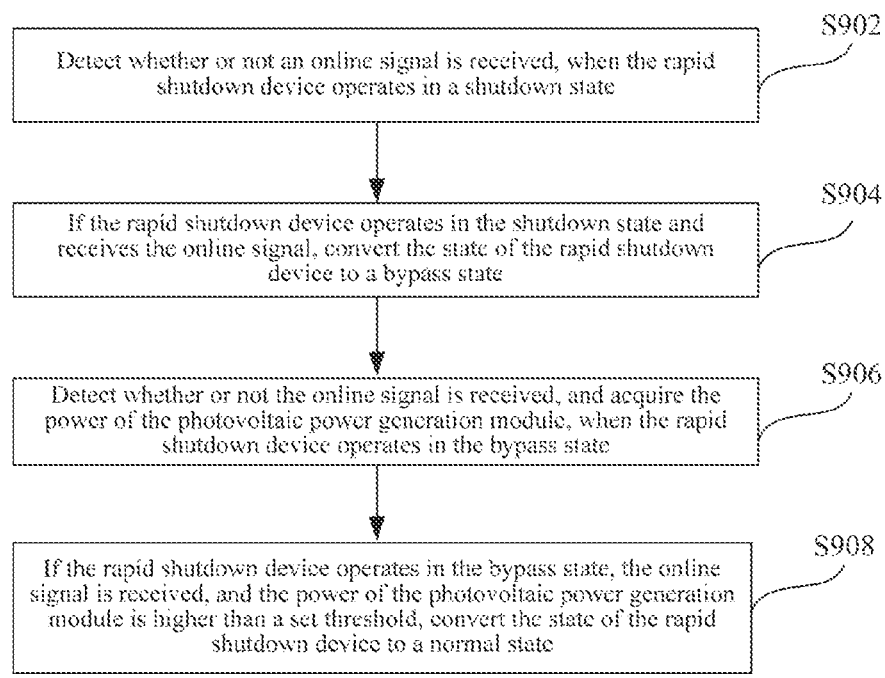
FIG. 9 schematically shows a flow chart of a control method for a rapid shutdown device of a photovoltaic system according to embodiments of the present disclosure.

As shown in FIG. 9, an embodiment of the present disclosure provides a control method for a rapid shutdown device, and the control method includes the following steps.

At step S902, when the rapid shutdown device operates in a shutdown state, it is detected whether or not an online signal is received.

At step S904, if the rapid shutdown device operates in the shutdown state and receives the online signal, the state of the rapid shutdown device is converted to a bypass state.

At step S906, when the rapid shutdown device operates in the bypass state, it is detected whether or not the online signal is received, and power of the photovoltaic power generation module is acquired.

At step S908, if the rapid shutdown device operates in the bypass state, the online signal is received, and the power of the photovoltaic power generation module is higher than a set threshold, then the state of the rapid shutdown device is converted to a normal state. The set threshold here is a power that can ensure the normal operation of the photovoltaic system.

Figure 10:
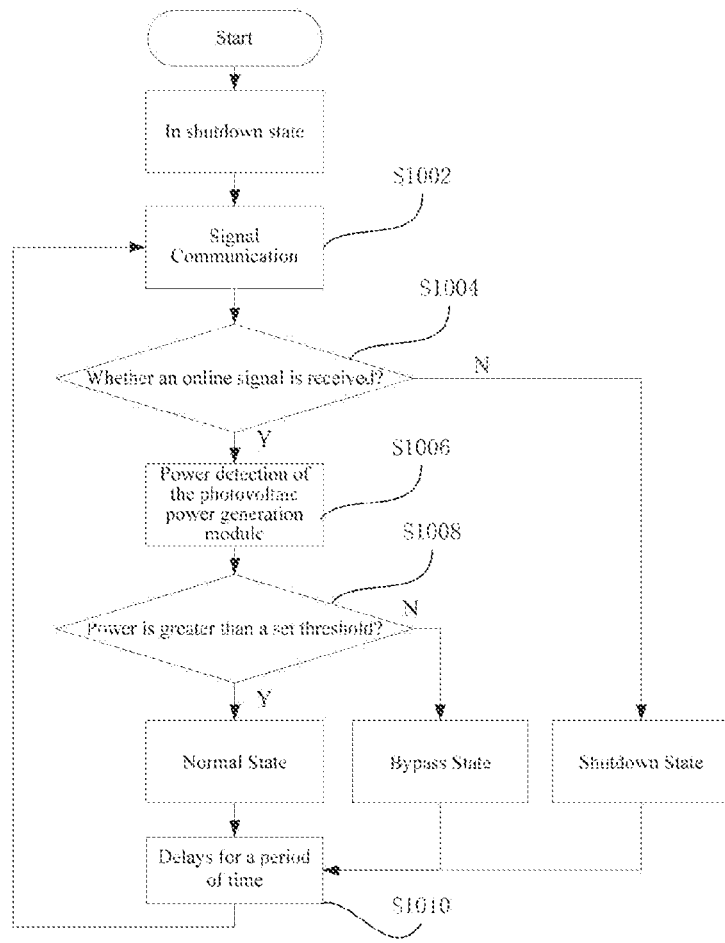
FIG. 10 schematically shows a flowchart of a control method for a rapid shutdown device of a photovoltaic system according to embodiments of the present disclosure.

As shown in FIG. 10, in some embodiments of the present disclosure, during the program initialization, the rapid shutdown device is operating in the shutdown state. After the initialization, step S1002 is performed to accomplish a signal communication, and then step S1004 is performed to determine whether an online signal is received. If the online signal is not received, the rapid shutdown device enters into the shutdown state; and if the online signal is received, step S1006 is performed to accomplish a power detection of the photovoltaic power generation module.

After power detection of the photovoltaic power generation module, step S1008 is performed to determine which state will be entered. If the power of the photovoltaic power generation module is greater than a set threshold, the rapid shutdown device operates in the normal state. If the power of the photovoltaic power generation module is not greater than the set threshold, that is, equal to or lower than the set threshold, the rapid shutdown device operates in the bypass state, and then delays for a period of time to return to the step S1002 and enter next round of detection loop.

As shown in FIG. 11, FIG. 12A, FIG. 12B, and FIG. 12C, a cyclic of the three states further includes the following steps.

After step S902, if the rapid shutdown device operates in the shutdown state and there's no online signal is received, the state of the rapid shutdown device remains unchanged, that is the rapid shutdown device still operates in the shutdown state.

After step S906, if the rapid shutdown device operates in the bypass state and there's no online signal is received, the state of the rapid shutdown device is converted to the shutdown state. If the rapid shutdown device operates in the bypass state, an online signal is received, and the power of the photovoltaic power generation module is equal to or lower than the set threshold, the state of the rapid shutdown device remains unchanged, that is the rapid shutdown device still operates in the bypass state.

Figure 11:
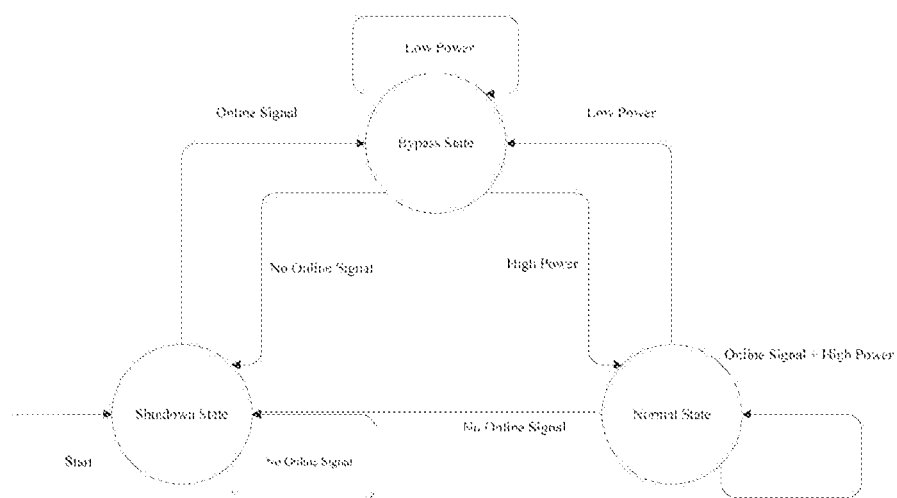
FIG. 11 schematically shows a cycle diagram of three operating states of a rapid shutdown device according to embodiments of the present disclosure.
Figure 12A:
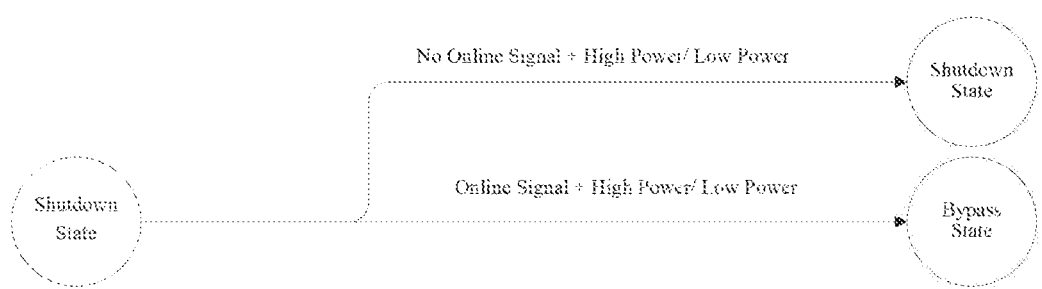
FIG. 12A schematically shows a transition diagram of a shutdown state of a rapid shutdown device according to embodiments of the present disclosure.
Figure 12B:
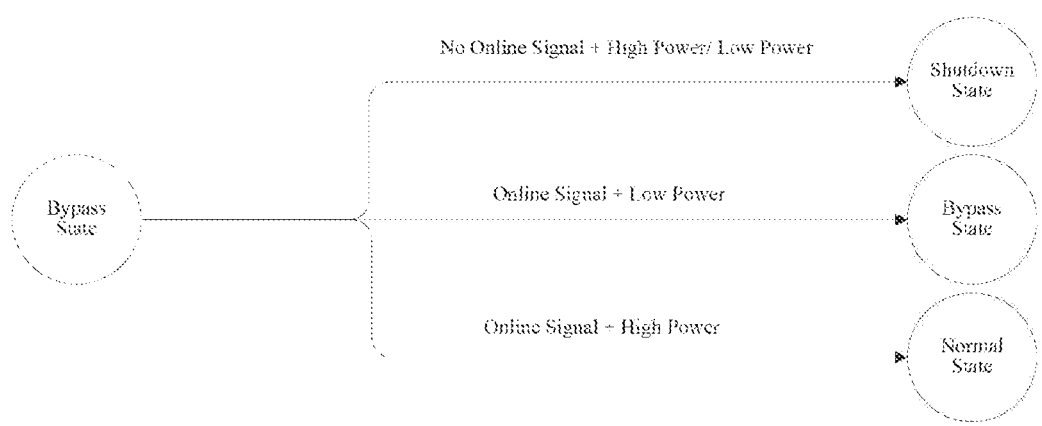
FIG. 12B schematically shows a transition diagram of a bypass state of a rapid shutdown device according to embodiments of the present disclosure.
Figure 12C:
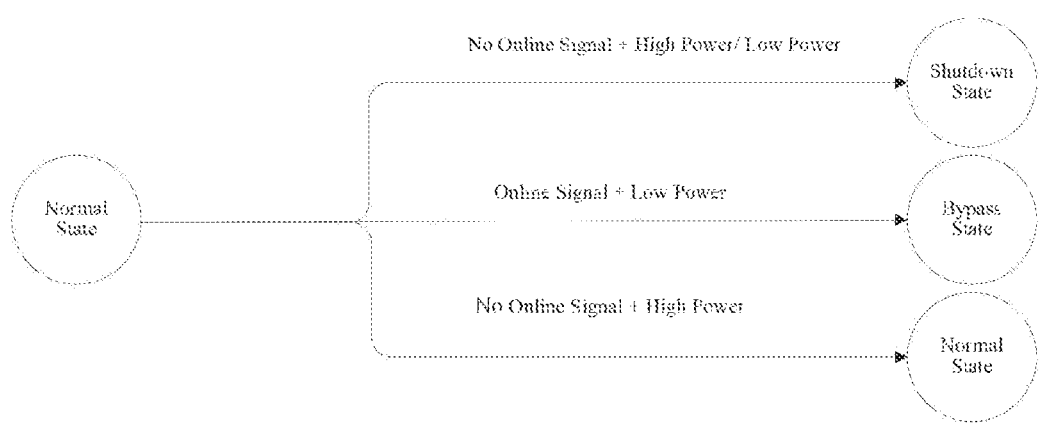
FIG. 12C schematically shows a transition diagram of a normal state of a rapid shutdown device according to embodiments of the present disclosure.

In addition, as shown in FIG. 11 and FIG. 12C, when the rapid shutdown device operates in the normal state, it is detected whether the online signal is received and the power of the photovoltaic power generation module is acquired; if the rapid shutdown device operates in the normal state, and the online signal is not received, the state of the rapid shutdown device is converted to the shutdown state; if the rapid shutdown device operates in the normal state, the online signal is received, and the power of the photovoltaic power generation module is higher than the set threshold, the state of the rapid shutdown device is maintained or unchanged; if the rapid shutdown device operates in the normal state, the online signal is received, and the power of the photovoltaic power generation module is equal to or lower than the set threshold, the state of the rapid shutdown device is converted to the bypass state.

In some embodiments of the present disclosure, the electrical parameter outputted by the photovoltaic power generation module need to be received. Herein, the electrical parameter is obtained by a detection circuit, and the detection circuit can be set inside the rapid shutdown device or outside the rapid shutdown device.

In some embodiments of the present disclosure, when detecting whether an online signal is received, the communication signal sent by the PLC communication circuit needs to be received. The communication signal is sent to the PLC communication circuit by the photovoltaic inverter or the triggering device; wherein the communication signal includes the online signal.

Specifically, as shown in FIG. 12A, the initial state of the rapid shutdown device is the shutdown state. There are two state switching modes under certain conditions, that is, when the off-line signal (i.e., no online signal) is received, the rapid shutdown device maintains the shutdown state; when the online signal is received, the rapid shutdown device converts to the bypass state.

As shown in FIG. 12B, when the rapid shutdown device is in the bypass state, there are three state switching modes under certain conditions, that is, when receiving the off-line signal (i.e., no online signal), the rapid shutdown device converts to the shutdown state; when receiving low power of the photovoltaic panel, i.e., the online signal and the low power both are received, the rapid shutdown device maintains operating in the bypass state; when receiving high power of the photovoltaic panel, i.e., the online signal and the high power both are received, the rapid shutdown device converts to the normal state.

As shown in FIG. 12C, when the rapid shutdown device is in the normal state, there are three state switching modes under certain conditions, that is, when receiving the off-line signal (i.e., no online signal), the rapid shutdown device converts to the shutdown state; when receiving the low power, i.e., the online signal and the low power both are received, the rapid shutdown device converts to the bypass state; when receiving the off-line signal (i.e., no online signal) and the high power, the rapid shutdown device maintains operating in the normal state.

Figure 3:
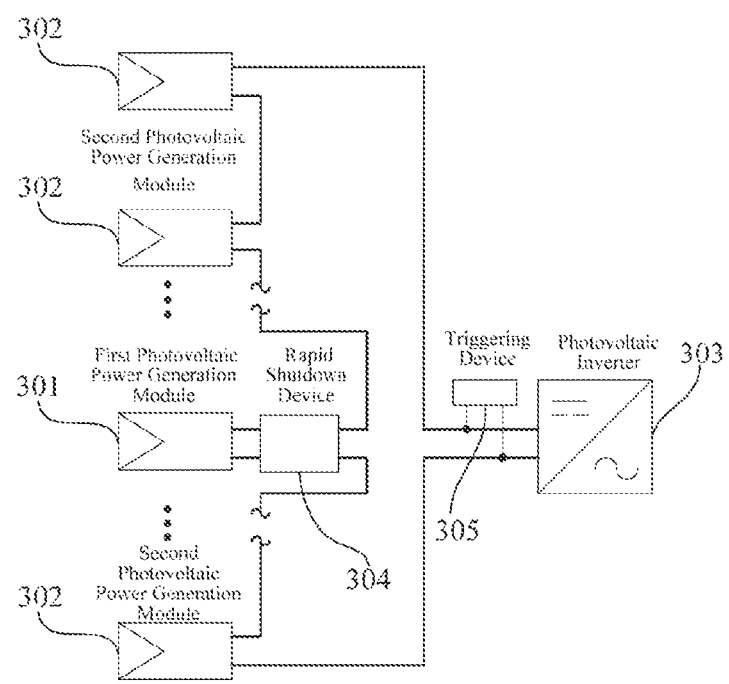
FIG. 3 schematically shows a schematic diagram of a photovoltaic system according to embodiments of the present disclosure.

The embodiments of the present disclosure also provide a protection system for a photovoltaic system, including at least one rapid shutdown device, each rapid shutdown device includes an input port and an output port, as shown in FIG. 3. The photovoltaic system of the present disclosure includes at least one first photovoltaic power generation module 301 and at least one second photovoltaic power generation module 302, and a photovoltaic inverter 303. The input port of the rapid shutdown device 304 is coupled to the first photovoltaic power generation module 301; all the second photovoltaic power generation modules 302 are connected in series with the output port of the rapid shutdown device.

Each of the rapid shutdown devices includes a controller, which is coupled to control terminals of the first switch, the second switch, the third switch, and the fourth switch, and is used to control on and off of the first to fourth switches, so that the rapid shutdown device can operates in the normal state, the bypass state or the shutdown state.

In some embodiments of the present disclosure, the connection position or the number of the rapid shutdown device can be flexibly selected according to standards and actual installation requirements. For example, the connection position of the rapid shutdown device can be selected as any one of the first photovoltaic power generation module, the last photovoltaic power generation module or the middle photovoltaic power generation module of a photovoltaic array composed of a plurality of photovoltaic power generation modules. In the photovoltaic array, the number of the rapid shutdown device can be flexible.

In some embodiments of the present disclosure, the protection system further includes at least one detection circuit, and each detection circuit is coupled to a corresponding first photovoltaic power generation module and the controller in the corresponding rapid shutdown device, so as to detect an electrical parameter outputted by the corresponding first photovoltaic power generation module and send the electrical parameter to the controller.

In some embodiments of the present disclosure, the protection system further includes at least one auxiliary power supply, and each auxiliary power supply is coupled to the corresponding first photovoltaic power generation module, so as to convert the direct current power of the first photovoltaic power generation module and transmit the converted power to the corresponding rapid shutdown device.

According to the rapid shutdown device for the photovoltaic system and the control method thereof in some embodiments of the present disclosure, by setting the first switch, the second switch, the third switch and the fourth switch in the rapid shutdown device, the on and off of these switches can be controlled, in order to flexibly control the photovoltaic power generation module to be connected to or disconnected from the photovoltaic system. The present disclosure needs a minimum of one rapid shutdown device to be connected to the photovoltaic system to realize the shutdown protection of the entire photovoltaic system, and the cost is lower.

The rapid shutdown device used in the photovoltaic system in some embodiments of the present disclosure adopts a combination of a semiconductor switch and a mechanical switch, which can improve the stability and reliability of the entire photovoltaic system.

In some embodiments of the present disclosure, the rapid shutdown device for a photovoltaic system is connected between a photovoltaic power generation module and a photovoltaic inverter, and includes an input port and an output port, the rapid shutdown device includes: a first switch and a second switch, wherein a first terminal of the first switch is connected to one terminal of the input port, a second terminal of the first switch is connected to a first terminal of the second switch, and a second terminal of the second switch is connected to the other terminal of the input port; a third switch and a fourth switch, wherein the third switch is connected between the first terminal of the second switch and one terminal of the output port, and the fourth switch is connected between the second terminal of the second switch and the other terminal of the output port; and a controller, coupled to the control terminals of the first switch, the third switch, and the fourth switch respectively, and configured to control on and off of the first switch, the third switch, and the fourth switch, so that the rapid shutdown device operates in a normal state, a bypass state or a shutdown state; wherein, in response to the rapid shutdown device operates in the normal state, the first switch, the third switch, and the fourth switch are all on, and the second switch is off; in response to the rapid shutdown device operates in the bypass state, the second switch, the third switch, and the fourth switch are all on, and the first switch is off; and in response to the rapid shutdown device operates in the shutdown state, both the third switch and the fourth switch are off.

In some embodiments of the present disclosure, the second switch includes a diode; and the third switch and the fourth switch respectively include a relay.

In some embodiments of the present disclosure, the first switch includes a semiconductor switch.

In some embodiments of the present disclosure, the rapid shutdown device further includes a detection circuit, the detection circuit is coupled to the photovoltaic power generation module and the controller, so as to detect an electrical parameter outputted by the photovoltaic power generation module and transmit the electrical parameter to the controller.

In some embodiments of the present disclosure, the rapid shutdown device further includes an auxiliary power supply, the auxiliary power supply is coupled to the photovoltaic power generation module, and is configured to convert direct current electric energy outputted from the photovoltaic power generation module and supply the converted power to the rapid shutdown device.

In some embodiments of the present disclosure, the rapid shutdown device further includes a programmable logic controller (PLC) communication circuit, the PLC communication circuit is coupled to the photovoltaic inverter, and is configured to receive a communication signal sent by the photovoltaic inverter, and send the processed communication signal to the controller.

In some embodiments of the present disclosure, the control method for the rapid shutdown device above includes when the rapid shutdown device operates in a shutdown state, detecting whether an online signal is received; in response to the rapid shutdown device operates in a shutdown state and the online signal is received, converting a state of the rapid shutdown device to a bypass state; when the rapid shutdown device operates in the bypass state, detecting whether the online signal is received, and acquiring an electrical parameter of the photovoltaic power generation module; and in response to the rapid shutdown device operates in the bypass state, the online signal is received, and the electrical parameter of the photovoltaic power generation module is higher than a set threshold, converting the state of the rapid shutdown device to a normal state.

In some embodiments of the present disclosure, the control method further includes: in response to the rapid shutdown device operates in the shutdown state and the online signal is not received, maintaining the rapid shutdown device operating in the shutdown state.

In some embodiments of the present disclosure, the control method further includes: in response to the rapid shutdown device operates in the bypass state and the online signal is not received, converting the state of the rapid shutdown device to the shutdown state; and in response to the rapid shutdown device operates in the bypass state, the online signal is received, and the electrical parameter of the photovoltaic power generation module is equal to or lower than the set threshold, maintaining the rapid shutdown device operating in the bypass state.

In some embodiments of the present disclosure, the control method further includes: when the rapid shutdown device operates in the normal state, detecting whether the online signal is received, and acquiring the electrical parameter of the photovoltaic power generation module; in response to the rapid shutdown device operates in the normal state, and the online signal is not received, converting the state of the rapid shutdown device to the shutdown state; in response to the rapid shutdown device operates in the normal state, the online signal is received, and the electrical parameter of the photovoltaic power generation module is higher than the set threshold, maintaining the rapid shutdown device operating in the normal state; and in response to the rapid shutdown device operates in the normal state, the online signal is received, and the electrical parameter of the photovoltaic power generation module is equal to or lower than the set threshold, converting the state of the rapid shutdown device to the bypass state.

In some embodiments of the present disclosure, the control method further includes: receiving a communication signal sent by a programmable logic controller (PLC) communication circuit, wherein the communication signal is sent by the photovoltaic inverter to the PLC communication circuit, and the communication signal includes the online signal.

In some embodiments of the present disclosure, the protection system includes at least one rapid shutdown device, each of the at least one rapid shutdown device having an input port and an output port, wherein the photovoltaic system includes at least one first photovoltaic power generation module and at least one second photovoltaic power generation module, and a photovoltaic inverter. Each of the rapid shutdown devices includes: a first switch, a second switch, a third switch, a fourth switch and a controller, wherein a first terminal of the first switch is connected to one terminal of the input port, a second terminal of the first switch is connected to a first terminal of the second switch, and a second terminal of the second switch is connected to the other terminal of the input port, the third switch is connected between the first terminal of the second switch and one terminal of the output port, and the fourth switch is connected between the second terminal of the second switch and the other terminal of the output port. The controller is coupled to the control terminals of the first switch, the third switch, and the fourth switch respectively, and is configured to control on and off of the first switch, the third switch, and the fourth switch, so that the rapid shutdown device operates in a normal state, a bypass state or a shutdown state; wherein the input port of each of the at least one rapid shutdown device is coupled to a corresponding first photovoltaic power generation module, and the at least one second photovoltaic power generation module is connected in series with the output port of the rapid shutdown device.

In some embodiments of the present disclosure, the second switch includes a diode, and the third switch and the fourth switch respectively include a relay.

In some embodiments of the present disclosure, the protection system further includes at least one detection circuit, each of the detection circuits being coupled to a corresponding photovoltaic power generation module and the controller in a corresponding rapid shutdown device, and being configured to detect the electrical parameter outputted by the corresponding photovoltaic power generation module, and send the electrical parameter to the controller.

In some embodiments of the present disclosure, the protection system further includes at least one auxiliary power supply, each of the auxiliary power supplies being coupled to a corresponding first photovoltaic power generation module, and configured to convert a direct current power of the corresponding first photovoltaic power generation module and supply the converted power to a corresponding rapid shutdown device.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

What is claimed is:

1. A rapid shutdown device for a photovoltaic system, connected between a photovoltaic power generation module and a photovoltaic inverter, and comprising an input port and an output port, the rapid shutdown device comprising:

a first switch and a second switch, wherein a first terminal of the first switch is connected to one terminal of the input port, a second terminal of the first switch is connected to a first terminal of the second switch, and a second terminal of the second switch is connected to the other terminal of the input port;

a third switch and a fourth switch, wherein the third switch is connected between the first terminal of the second switch and one terminal of the output port, and the fourth switch is connected between the second terminal of the second switch and the other terminal of the output port; and a controller, coupled to the control terminals of the first switch, the third switch, and the fourth switch respectively, and configured to control on and off of the first switch, the third switch, and the fourth switch, so that the rapid shutdown device operates in a normal state, a bypass state or a shutdown state;

wherein, in response to the rapid shutdown device operates in the normal state, the first switch, the third switch, and the fourth switch are all on, and the second switch is off;

in response to the rapid shutdown device operates in the bypass state, the second switch, the third switch, and the fourth switch are all on, and the first switch is off; and in response to the rapid shutdown device operates in the shutdown state, both the third switch and the fourth switch are off.

2. The rapid shutdown device according to claim 1, wherein the second switch comprises a diode; and the third switch and the fourth switch respectively comprise a relay.

3. The rapid shutdown device according to claim 1, wherein the first switch comprises a semiconductor switch.

4. The rapid shutdown device according to claim 1, wherein the rapid shutdown device further comprises a detection circuit coupled to the photovoltaic power generation module and the controller, so as to detect an electrical parameter outputted by the photovoltaic power generation module and transmit the electrical parameter to the controller.

5. The rapid shutdown device according to claim 1, wherein the rapid shutdown device further comprises an auxiliary power supply, the auxiliary power supply is coupled to the photovoltaic power generation module, and is configured to convert direct-current power outputted from the photovoltaic power generation module and supply the converted power to the rapid shutdown device.

6. The rapid shutdown device according to claim 1, wherein the rapid shutdown device further comprises a programmable logic controller (PLC) communication circuit, the PLC communication circuit is coupled to the photovoltaic inverter, and is configured to receive a communication signal sent by the photovoltaic inverter, and send the communication signal to the controller.

7. A control method for a rapid shutdown device, the rapid shutdown device being applied to a photovoltaic system, being connected between a photovoltaic power generation module and a photovoltaic inverter and comprising an input port and an output port, the rapid shutdown device further comprising:

a first switch and a second switch, wherein a first terminal of the first switch is connected to one terminal of the input port, a second terminal of the first switch is connected to a first terminal of the second switch, and a second terminal of the second switch is connected to the other terminal of the input port;

a third switch and a fourth switch, wherein the third switch is connected between the first terminal of the second switch and one terminal of the output port, and the fourth switch is connected between the second terminal of the second switch and the other terminal of the output port; and a controller, coupled to the control terminals of the first switch, the third switch, and the fourth switch respectively, and configured to control on and off of the first switch, the third switch, and the fourth switch, so that the rapid shutdown device operates in a normal state, a bypass state or a shutdown state;

the control method comprising:

when the rapid shutdown device operates in a shutdown state, detecting whether an online signal is received;

in response to the rapid shutdown device operates in a shutdown state and the online signal is received, converting a state of the rapid shutdown device to a bypass state, when the rapid shutdown device operates in the bypass state, detecting whether the online signal is received, and acquiring an electrical parameter of the photovoltaic power generation module; and in response to the rapid shutdown device operates in the bypass state, the online signal is received, and the electrical parameter of the photovoltaic power generation module is higher than a set threshold, converting the state of the rapid shutdown device to a normal state.

8. The control method according to claim 7, wherein the control method further comprising:

in response to the rapid shutdown device operates in the shutdown state and the online signal is not received, maintaining the rapid shutdown device operating in the shutdown state.

9. The control method according to claim 7, wherein the control method further comprising:

in response to the rapid shutdown device operates in the bypass state and the online signal is not received, converting the state of the rapid shutdown device to the shutdown state; and in response to the rapid shutdown device operates in the bypass state, the online signal is received, and the electrical parameter of the photovoltaic power generation module is equal to or lower than the set threshold, maintaining the rapid shutdown device operating in the bypass state.

10. The control method according to claim 7, wherein the control method further comprising:

when the rapid shutdown device operates in the normal state, detecting whether the online signal is received, and acquiring the electrical parameter of the photovoltaic power generation module;

in response to the rapid shutdown device operates in the normal state, and the online signal is not received, converting the state of the rapid shutdown device to the shutdown state;

in response to the rapid shutdown device operates in the normal state, the online signal is received, and the electrical parameter of the photovoltaic power generation module is higher than the set threshold, maintaining the rapid shutdown device operating in the normal state; and in response to the rapid shutdown device operates in the normal state, the online signal is received, and the electrical parameter of the photovoltaic power generation module is equal to or lower than the set threshold, converting the state of the rapid shutdown device to the bypass state.

11. The control method according to claim 7, wherein the control method further comprising:

receiving a communication signal sent by a programmable logic controller (PLC) communication circuit, wherein the communication signal is sent by the photovoltaic inverter to the PLC communication circuit, and the communication signal comprises the online signal.

12. A protection system for a photovoltaic system, comprising at least one rapid shutdown device, each of the at least one rapid shutdown device having an input port and an output port, wherein the photovoltaic system comprises at least one first photovoltaic power generation module and at least one second photovoltaic power generation module, and a photovoltaic inverter;

each of the rapid shutdown devices comprising:

a first switch and a second switch, wherein a first terminal of the first switch is connected to one terminal of the input port, a second terminal of the first switch is connected to a first terminal of the second switch, and a second terminal of the second switch is connected to the other terminal of the input port;

a third switch and a fourth switch, wherein the third switch is connected between the first terminal of the second switch and one terminal of the output port, and the fourth switch is connected between the second terminal of the second switch and the other terminal of the output port; and a controller, coupled to the control terminals of the first switch, the third switch, and the fourth switch respectively, and configured to control on and off of the first switch, the third switch, and the fourth switch, so that the rapid shutdown device operates in a normal state, a bypass state or a shutdown state;

wherein the input port of each of the at least one rapid shutdown device is coupled to a corresponding first photovoltaic power generation module, and the at least one second photovoltaic power generation module is connected in series with the output port of the rapid shutdown device.

13. The protection system according to claim 12, wherein the second switch comprises a diode; and the third switch and the fourth switch respectively comprise a relay.

14. The protection system according to claim 12, wherein the protection system further comprising:

at least one detection circuit, each of the detection circuits being coupled to a corresponding photovoltaic power generation module and the controller in a corresponding rapid shutdown device, and being configured to detect the electrical parameter outputted by the corresponding photovoltaic power generation module, and send the electrical parameter to the controller.

15. The protection system according to claim 12, wherein the protection system further comprising:

at least one auxiliary power supply, each of the auxiliary power supplies being coupled to a corresponding first photovoltaic power generation module, and configured to convert a direct current power of the corresponding first photovoltaic power generation module and supply the converted power to a corresponding rapid shutdown device.

* * * * *